(12) United States Patent
Gibson et al.

(10) Patent No.: US 10,369,841 B2
(45) Date of Patent: Aug. 6, 2019

(54) WHEEL HUB SYSTEM INCLUDING A RETAINER FOR POSITIONING COMPONENTS DURING ASSEMBLY

(71) Applicant: Schaeffler Technologies AG & Co. KG, Herzogenaurach (DE)

(72) Inventors: Cameron Gibson, Royal Oak, MI (US); Ahmadreza Sedighi, Troy, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 122 days.

(21) Appl. No.: 15/406,174

(22) Filed: Jan. 13, 2017

(65) Prior Publication Data

US 2018/0201060 A1    Jul. 19, 2018

(51) Int. Cl.
*B60B 27/06* (2006.01)
*B60B 27/00* (2006.01)
*F16D 3/16* (2006.01)

(52) U.S. Cl.
CPC ........ *B60B 27/065* (2013.01); *B60B 27/0031* (2013.01); *B60B 27/001* (2013.01); *B60B 27/0005* (2013.01); *B60B 27/0094* (2013.01); *B60B 2320/10* (2013.01); *F16D 3/16* (2013.01)

(58) Field of Classification Search
CPC . B60B 27/065; B60B 27/0031; B60B 27/001; B60B 27/0005; B60B 2320/10; F16D 3/16
USPC ...................................................... 301/105.1
See application file for complete search history.

(56) References Cited

U.S. PATENT DOCUMENTS

| | | | |
|---|---|---|---|
| 4,460,058 A * | 7/1984 | Welschof | B60B 27/0005 180/258 |
| 6,135,571 A * | 10/2000 | Mizukoshi | B60B 27/00 180/252 |
| 6,648,518 B2 | 11/2003 | Uchman | |
| 7,534,172 B2 | 5/2009 | Wormsbaecher | |
| 8,480,306 B2 * | 7/2013 | Fukumura | B60B 27/00 29/898.06 |
| 2010/0254754 A1 | 10/2010 | Berube et al. | |
| 2010/0284736 A1 | 11/2010 | Langer et al. | |

(Continued)

FOREIGN PATENT DOCUMENTS

| WO | 2007055685 A1 | 5/2007 |
|---|---|---|
| WO | 2007076353 A1 | 7/2007 |

*Primary Examiner* — S. Joseph Morano
*Assistant Examiner* — Jean W Charleston
(74) *Attorney, Agent, or Firm* — Volpe and Koenig, P.C.

(57) ABSTRACT

A wheel hub system is disclosed. The wheel hub system has a hub assembly, a joint component, and a threaded bolt. The hub assembly has a hub having a though-hole, a circumferential groove formed in the through-hole, and a first support surface having a first plurality of teeth. The hub assembly also has a bearing unit positioned on the hub. The joint component is secured to the hub assembly and has a projection positioned in the through-hole and having a threaded bore and a retainer positioned in the circumferential groove. The joint component also has a second support surface having a second plurality of teeth operatively engaging the first plurality of teeth. The retainer positions the hub assembly and the joint component relative to each other during assembly. The threaded bolt is positioned in the threaded bore and secures the hub assembly in the position.

15 Claims, 2 Drawing Sheets

(56) References Cited

U.S. PATENT DOCUMENTS

| | | | |
|---|---|---|---|
| 2013/0172088 A1* | 7/2013 | Umekida | F16D 1/0858 403/359.1 |
| 2014/0054954 A1* | 2/2014 | Hofmann | B60B 27/065 301/111.03 |

* cited by examiner

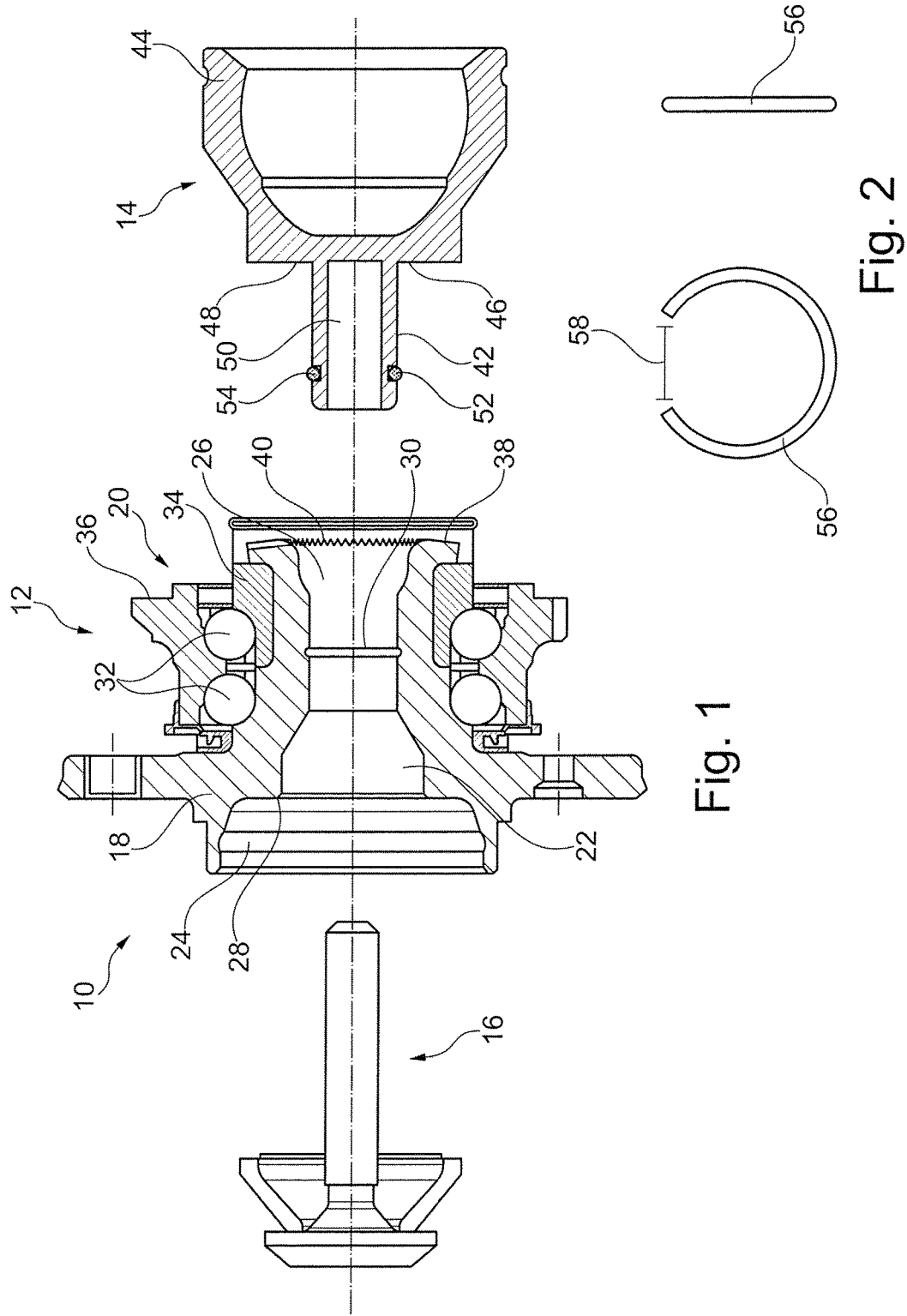

WHEEL HUB SYSTEM INCLUDING A RETAINER FOR POSITIONING COMPONENTS DURING ASSEMBLY

FIELD OF INVENTION

The present invention relates to a wheel hub system, and, more particularly, to a wheel hub system including a retainer for positioning components during assembly.

BACKGROUND

A wheel hub system of a vehicle may include a hub assembly operatively connected to a joint component, such as an outer component of a constant velocity joint. The operative connection is created by features configured to transmit a torque between the hub assembly and the joint component. U.S. Patent Application Publication No. 2010/0284736 describes one such wheel hub system in which torque is transferred between a hub assembly and an outer component of a constant velocity joint through engagement of opposing pluralities of teeth formed on facing surfaces of the respective components. In order to maintain the engagement of the teeth, a bolt is inserted through the hub assembly and into a threaded bore in the joint component.

While the bolt is sufficient to securely hold the components together, a problem arises during assembly of such wheel hub systems. In particular, in order to properly secure the hub assembly and the joint component, the components must be held together by an operator prior to inserting and tightening the bolt. If the components are not held in the correct position when the bolt is connected, the pluralities of teeth may not be aligned or seated properly. This complicates the assembly process, requiring an additional operator or separate device to hold the components together during assembly.

Some wheel hub systems include a retaining diaphragm (such as in U.S. Pat. No. 6,648,518) or a spring positioned on the bolt to urge the hub assembly and joint component toward each other to achieve proper alignment. These potential solutions, however, only assist after the bolt is inserted, and therefore still require an operator or device in an additional assembly step to hold the components together prior to the bolt being inserted.

The present disclosure is directed to overcoming one or more problems of the prior art.

SUMMARY

In one aspect, the present disclosure is directed to a hub assembly. The hub assembly includes a hub and a bearing unit positioned on the hub. The hub includes a through-hole extending between opposite ends of the hub in an axial direction, a support surface including a plurality of teeth surrounding an opening into the through hole, and a circumferential groove formed in the through-hole. The through-hole includes a plurality of sections having different diameters, including a first portion having a greater diameter than a second portion. The circumferential groove is formed in the second portion and is configured to receive a retainer on an outer surface of a projection of a joint component.

In another aspect, the present disclosure is directed to a wheel hub system. The wheel hub system includes a hub assembly, a joint component, and a threaded bolt. The hub assembly includes a hub having a though-hole, a circumferential groove formed in the through-hole, and a first support surface having a first plurality of teeth. The hub assembly preferably also includes a bearing unit positioned on the hub. The joint component is secured to the hub assembly and has a projection positioned in the through-hole and includes a threaded bore and a retainer positioned in the circumferential groove. The joint component also includes a second support surface having a second plurality of teeth operatively engaging the first plurality of teeth. The threaded bolt is positioned in the threaded bore and secures the hub assembly to the joint component.

In another aspect, the present disclosure is directed to a method of assembling a wheel hub system. The method includes inserting a projection of a joint component into a first end of a through-hole of a hub assembly, the projection including a retainer on an outer surface thereof. The method also includes positioning the retainer in a circumferential groove formed on an inner surface of the through-hole, the retainer, by being positioned in the circumferential groove, holding the joint component to the hub assembly in a position in which a first plurality of teeth formed on the hub assembly operatively engage a second plurality of teeth formed on the joint component. The method further includes inserting a threaded bolt into a second end of the through-hole and into a threaded bore formed in the projection to secure the joint component to the hub assembly.

BRIEF DESCRIPTION OF THE DRAWING(S)

The foregoing Summary and the following detailed description will be better understood when read in conjunction with the appended drawings, which illustrate a preferred embodiment of the invention. In the drawings:

FIG. 1 is a cross-sectional view of the unassembled components of an exemplary disclosed wheel hub system;

FIG. 2 is a front and side view illustration of a retainer that may be used in conjunction with the wheel hub system of FIG. 1;

DETAILED DESCRIPTION OF THE PREFERRED EMBODIMENT(S)

Figure 3:
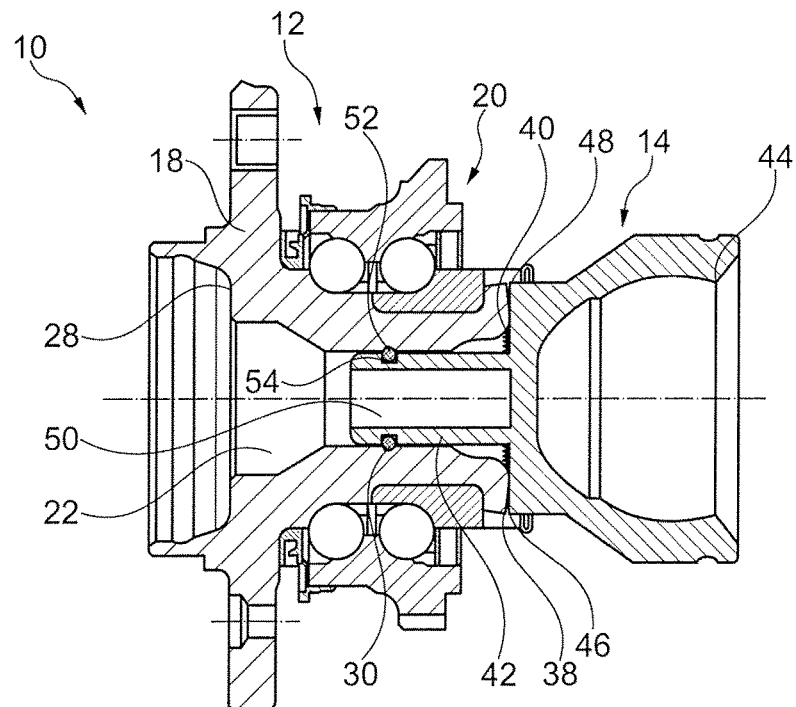
FIG. 3 is a cross-sectional view of a sub-assembly of the wheel hub system of FIG. 1, including components being held together by the retainer of FIG. 2.

FIG. 1 shows an exemplary wheel hub system 10 with some of the components thereof in an unassembled position. The wheel hub system 10 may be a sub-system of a motor vehicle system, such as a drive system. For example, the wheel hub system 10 may connect a rotatable drive shaft between a vehicle transmission and a wheel. In an exemplary embodiment, the wheel hub system 10 includes a hub assembly 12, a joint component 14, and a threaded bolt 16.

The hub assembly 12 includes a hub 18 and a bearing unit 20 positioned on the hub 18. The hub 18 includes a through-hole 22 extending between opposite ends of the hub 18 in an axial direction. The through-hole 22 may include a plurality of sections having different diameters and/or widths. For example, the through-hole 22 may include a first portion 24 having a greater diameter than a second portion 26. A flange 28 may be formed at a transition between the first portion 24 and the second portion 26.

A circumferential groove 30 is formed in the through-hole 22. The circumferential groove 30 is formed in the second portion 26. Within the second portion 26, the circumferential groove 30 may be positioned in a center section between opposing end sections having greater diameters that the center section. In one embodiment, the circumferential groove 30 may be axially aligned with the bearing unit 20 (e.g., positioned radially beneath at least a portion of the bearing unit 20). It should be understood, however, that the position of the circumferential groove 30 is not limited to the position illustrated, and the through-hole 22 is not limited to the configuration shown.

The bearing unit 20 is positioned on an exterior of the hub 18 and is configured to provide bearing support to rotation of the hub 18. In an exemplary embodiment, the bearing unit 20 includes two bearing races for a plurality of roller rolling elements 32, which may be ball bearings, needle bearings, tapered rolling bearings, or the like. The bearing unit 20 may include an inner ring 34 and an outer ring 36 to form the bearing races. For example, a first bearing race may be formed between an exterior surface of the hub 18 and the outer ring 36 and a second bearing race may be formed between the inner ring 34 and the outer ring 36. In some embodiments, the inner ring 34 is positioned in a cutout in the hub 18 and the circumferential groove 30 is axially aligned with the inner ring 34.

The hub 18 further includes a support surface 38 (a first support surface of the wheel hub system 10) surrounding an opening into the through-hole 22. The support surface 38 includes a feature configured to engage the joint component 14 such that a torque may be transferred between the joint component 14 and the hub assembly 12. For example, the support surface 38 includes a plurality of teeth 40 (a first plurality of teeth of the wheel hub system 10). In an exemplary embodiment, the support surface 38 faces the axial direction. In other embodiments, the support surface 38 may face in a radial direction or some direction between the axial and radial directions.

The joint component 14 includes a projection 42 on one side thereof and a connection member 44 on an opposite side thereof. The projection 42 is configured to connect the joint component 14 to the hub assembly 12. The connection member 44 is configured to connect the joint component 14 to another joint component (not shown). For example, the joint component 14 may be an outer joint component of a constant velocity joint and the connection member 44 may be a socket configured to receive a second joint component (e.g., an inner joint component) to form the constant velocity joint.

The joint component 14 further includes a support surface 46 (a second support surface of the wheel hub system 10) surrounding the projection 42. The support surface 46 includes a feature configured to engage the support surface 38 of the hub 18. For example, the support surface 46 also includes a plurality of teeth 48 (a second plurality of teeth of the wheel hub system 10). The support surface 46 is formed to face the support surface 38 (e.g., in the opposite axial direction). The pluralities of teeth 40, 48 are formed to correspondingly engage with each other (e.g., fit alternatively within each other) such that a plurality of surface contact points are created (e.g., a face spline configuration). The plurality of surface contact points create a positive locking engagement configured to transfer a torque between the hub assembly 12 and the joint component 14.

The projection 42 includes a threaded bore 50 and a retainer 52. In an exemplary embodiment, the projection 42 is formed as a cylindrical shaft projecting from a surface of the connection member 44. In an exemplary embodiment, the retainer 52 is held in a groove 54 in an outer surface of the projection 42. The retainer 52 is configured to be positioned in the circumferential groove 30 to hold the joint component 14 to the hub assembly 12. The threaded bore 50 is configured to receive the threaded bolt 16 to securely lock the hub assembly 12 and the joint component 14 together.

In an exemplary embodiment, the retainer 52 is a circlip. A circlip, as is known in the art, is a flexible fastener. In the disclosed embodiment, the retainer 52 as a circlip is configured to flex to allow insertion of the projection 42 into the through-hole 22 and expand or snap into the circumferential groove 30 when aligned therewith. In other embodiments, the retainer may be a similar fastener, such as a snap ring, C-clip, O-ring, spring plate, or the like.

FIG. 2 illustrates an exemplary embodiment of the retainer 52 as a circlip. As illustrated, the retainer 52 includes a body 56 with a gap 58 formed between opposing ends of the body 56. The body 56 may be circular, semi-circular, oval-shaped, square, etc. The retainer 52 may be dimensioned (e.g., inner diameter, length, axial width, radial width, etc.) to reliably snap into the circumferential groove 30 when the projection 42 is inserted into the through-hole 22.

FIG. 3 illustrates a sub-assembly of the wheel hub system 10. For example, FIG. 3 illustrates a sub-assembly in which the joint component 14 is held to the hub assembly 12 by the retainer 52 and circumferential groove 30, prior to connection of the threaded bolt 16. In an exemplary embodiment, the circumferential groove 30 is positioned within the through-hole 22 and the retainer 52 is positioned on the projection 42 such that the retainer 52 engages the circumferential groove 30 at a position in which the pluralities of teeth 40, 48 engage with each other (e.g., are properly aligned and seated). In this way, the joint component 14 is held to the hub assembly 12 in a position in which tightening of the threaded bolt 16 in the threaded bore 50 results in proper engagement between the support surfaces 38, 46.

Figure 4:
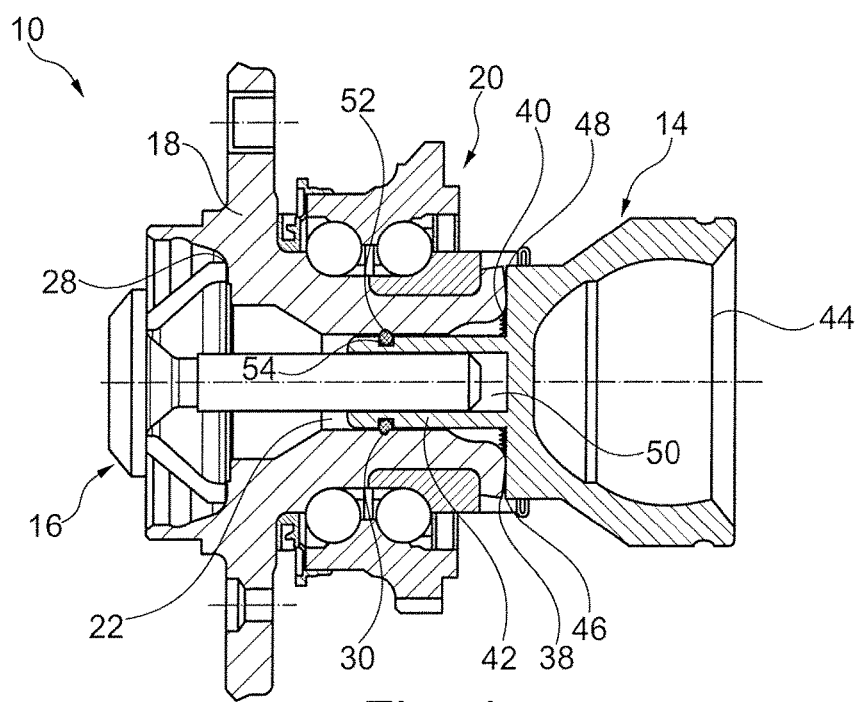
FIG. 4 is a cross-sectional view of the components of the wheel hub system of FIG. 1 as assembled, including a bolt securing the components of the sub-assembly of FIG. 3.

FIG. 4 illustrates the wheel hub system 10, as assembled, with the threaded bolt 16 inserted in the threaded bore 50. In an exemplary embodiment, a head portion or engagement member near a proximal end of the threaded bolt 16 contacts the flange 28 in order force the hub assembly 12 toward the joint component 14, thereby locking the components of wheel hub system 10 in place.

The disclosed retainer 52 is applicable to the wheel hub system 10 or other similar systems or assemblies in order to assist and improve an assembly process. For example, the disclosed retainer 52 and circumferential groove 30 configuration holds two components (e.g., the hub assembly 12 and the joint component 14) relative to each other prior to connection of a fastener (e.g., the threaded bolt 16). This ensures that the components are in a proper position when the fastener is installed and obviates the need for an additional operator or device to hold the components in such a position, thereby reducing the amount of assembly steps and the complexity of the assembly process.

An exemplary process for assembling wheel hub system 10 will now be described. First, the hub assembly 12 and joint component 14 are joined and held together by the retainer 52 and the circumferential groove 30 to achieve the sub-assembly depicted in FIG. 3. For example, the projection 42 of the joint component 14 is inserted into a first end of the through-hole 22 until the retainer 52 reaches and expands into the circumferential groove 30. In the disclosed embodiment in which the retainer 52 is a circlip, the above step may be achieved through the body 56 being compressed such that the gap 58 is shortened inside the through-hole 22. When the circumferential groove 30 is reached during an axial traverse of the projection 42, an internal spring force urges the gap 58 to increase and the body 56 to thereby snap into the circumferential groove 30.

In the disclosed embodiment, the retainer 52, by being positioned in the circumferential groove 30, holds the joint component 14 to the hub assembly 12 in a position in which the plurality of teeth 48 operatively engage the plurality of teeth 40 (e.g., there is proper alignment and seating of the teeth).

In the next step of the method, the threaded bolt 16 is inserted into a second end of the through-hole 22 and into the threaded bore 50. The threaded bolt 16 is tightened to a predetermined torque to thereby secure the joint component 14 to the hub assembly 12.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A hub assembly, comprising:
a hub including:
   a through-hole extending between opposite ends of the hub in an axial direction,
   a support surface including a plurality of teeth surrounding an opening into the through hole, and
   a circumferential groove formed in the through-hole; and
a bearing unit positioned on the hub,
wherein the through-hole includes a plurality of sections having different diameters, the plurality of sections including a first portion having a greater diameter than a second portion,
the circumferential groove being formed in the second portion, the second portion having a section with a constant diameter, the circumferential groove being axially positioned in a medial area of the section with the constant diameter, and the circumferential groove being configured to receive a retainer on an outer surface of a projection of a joint component.

2. The hub assembly of claim 1, wherein the circumferential groove is positioned in a center section between opposing end sections having greater diameters than the center section.

3. The hub assembly of claim 1, wherein the bearing unit includes an inner ring and an outer ring forming a pair of bearing races for a plurality of rolling elements.

4. The hub assembly of claim 3, wherein the circumferential groove is axially aligned with the bearing unit.

5. The hub assembly of claim 4, wherein the inner ring is positioned in a cutout in the hub and the circumferential groove is axially aligned with the inner ring.

6. The hub assembly of claim 1, wherein the hub includes a flange formed at a transition between the first portion and the second portion, the flange configured to contact a head portion or engagement member of a bolt.

7. The hub assembly according to claim 1, wherein the circumferential groove is configured to receive a circlip as the retainer.

8. A wheel hub system, comprising:
a hub assembly including:
   a hub having a though-hole, a circumferential groove formed in the through-hole, and a first support surface having a first plurality of teeth, and
   a bearing unit positioned on the hub;
a joint component secured to the hub assembly and including:
   a projection positioned in the through-hole and having a threaded bore and a retainer positioned in the circumferential groove, and
   a second support surface having a second plurality of teeth operatively engaging the first plurality of teeth; and
a threaded bolt positioned in the threaded bore and securing the hub assembly to the joint component, wherein the retainer is, by being positioned in the circumferential groove, configured to hold the joint component to the hub assembly in a position in which the second plurality of teeth engage the first plurality of teeth prior to the threaded bolt being positioned in the threaded bore.

9. The wheel hub system of claim 8, wherein the retainer is held in a groove formed in an outer surface of the projection.

10. The wheel hub system of claim 9, wherein the retainer is a circlip.

11. The wheel hub system of claim 8, wherein the bearing unit includes an inner ring and an outer ring forming a pair of bearing races for a plurality of rolling elements.

12. The wheel hub system of claim 11, wherein the circumferential groove is axially aligned with the bearing unit.

13. The wheel hub system of claim 8, wherein the first support surface faces the second support surface in an axial direction.

14. The wheel hub system of claim 13, wherein the first support surface is configured to transfer a torque to the second support surface through the operative engagement of the first and second plurality of teeth.

15. The wheel hub system of claim 8, wherein the joint component further includes a socket configured to receive a second joint component to form a constant velocity joint.

* * * * *